Patented Jan. 16, 1940

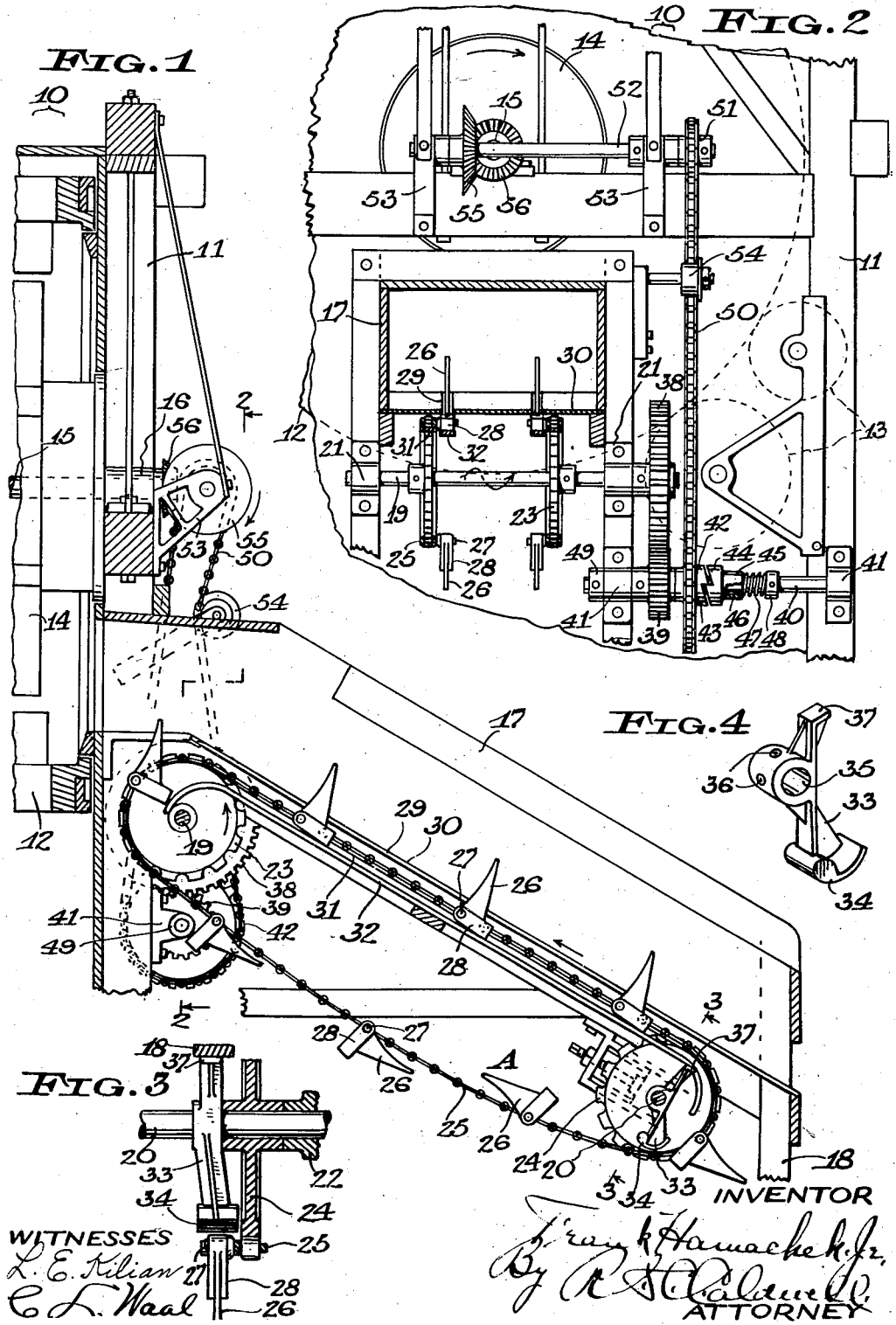
Jan. 16, 1940.  F. HAMACHEK, JR  2,187,026
FEEDER FOR PEA VINERS
Filed Sept. 22, 1937

2,187,026

UNITED STATES PATENT OFFICE

2,187,026

FEEDER FOR PEA VINERS

Frank Hamachek, Jr., Kewaunee, Wis., assignor to Frank Hamachek Machine Company, Kewaunee, Wis., a corporation of Wisconsin Application September 22, 1937, Serial No. 165,120

3 Claims. (Cl. 198—170)

The invention relates to feeders for pea viners and the like.

Pea viners are commonly equipped with feeders of the so-called "White" type, exemplified in United States Patent 908,053, issued December 29, 1908. A feeder of this type employs an endless conveyer with weighted feeding fingers pivotally mounted thereon, the fingers projecting upwardly while traveling through a feeding trough along which the vines are carried to the viner, and then dropping out of the way to be released from the vines.

Heretofore, considerable breakage has occurred on machines of this type because of catching or jamming of the pivoted fingers on various parts of the feeders, such as the supporting tracks for the fingers and the slotted decking through which the fingers project. Making the parts stronger and heavier has been found to effect no improvement.

When pea vines are harvested, the usual method is to cut them in the fields with mowers or harvesters, load them onto wagons or trucks, and then haul them to the viners. Since there is a considerable amount of sand, ground and dust brought in with the vines, and the juice from the vines is sticky, it has been found difficult to keep the feeder fingers freely swingable on their pivots. If the fingers on the return run of the conveyer do not hang in the proper position, there is danger of jamming and breakage. It is not possible to use kerosene or other cleaning solvents on the finger pivots as this will taint the peas.

Another cause for jamming and breakage of the feeder has been reverse travel of the feeding conveyer, the fingers catching at various points and particularly at the upper or discharge end of the conveyer. Occasionally, a viner is driven in reverse direction, either by mistake or for convenience when cleaning or repairing the viner or feeder, and since the feeder is driven by the same driving means as the viner, the feeder and other mechanism are subject to damage. It has been customary to provide for manual release of a feeder-driving chain or other driving connection to avoid such damage, but since the operators of the machines would sometimes fail or neglect to attend to this release, damage has nevertheless resulted.

It is an object of the present invention to provide an improved feeder having simple, durable and inexpensive means for insuring proper positioning of the pivoted feeding fingers when approaching feeding position, so as to avoid damage to the machine.

Another object of the invention is to provide driving means for the feeder which will automatically release upon the occurrence of reverse movement, so as to avoid damage to the feeder and other parts.

The invention further consists in the several features hereinafter described and claimed.

An embodiment of the invention is illustrated in the accompanying drawing, wherein:

Fig. 1 is a broken longitudinal sectional elevation of a viner feeder constructed in accordance with the invention;

Fig. 2 is a transverse sectional elevation taken generally along the line 2—2 of Fig. 1;

Fig. 3 is a detail sectional view taken generally along the line 3—3 of Fig. 1, and Fig. 4 is a perspective view of one of the finger-positioning devices.

In the drawing, 10 indicates a viner of usual construction having a frame 11 carrying a suitably driven horizontal separating drum 12 by supporting rollers 13, Fig. 2, the rollers at one side being shown. A suitably driven beater drum 14 is rotatably mounted within the separating drum and is carried on a shaft 15 journalled in bearings 16 on the opposite ends of the frame, one bearing being shown.

Pea vines are fed into one end of the machine from a conveyer trough 17 mounted on a frame 18 secured to the viner frame, the trough preferably being inclined and having its receiving end lower than the discharge end. A pair of spaced, parallel, horizontal cross-shafts 19 and 20 extend below the trough near the upper and lower ends thereof, respectively. The upper shaft 19 is journalled in bearings 21, Fig. 2, carried on the viner frame, while the cross-shaft 20 is preferably non-rotatable and is carried on heads or blocks 22 slidably adjustable on the feeder frame 18, as usual, the heads or blocks 22 forming, in effect, parts of the shaft. The shafts 19 and 20 carry one or more sprocket wheels 23 and 24, respectively, each shaft having two sprocket wheels in the present instance. The sprocket wheels 23 are fast on the shaft 19, while the sprocket wheels 24 are loose on the non-rotatable shaft 20, but are confined against axial movement. The upper and lower sprocket wheels are connected by conveyer chains 25 which have weighted feeding fingers 26 pivotally secured thereon at suitable intervals, the fingers being carried on pivot studs 27 projecting laterally from links of the chains, and being free to rotate on the studs to any angular position. Each finger is of triangular, blade-like shape and has a weight arm 28 extending at an angle therefrom, so as to cause the finger to hang from the lower run of the conveyer chain. At the upper run of the conveyer the fingers project upwardly in feeding position through longitudinal slots 29 formed in the bottom wall or deck structure 30 of the conveyer trough. Along the upper run, each chain slidably rests on an inclined guide rail or track 31, and the trailing weight arms 28 of the fingers slidably rest on inclined guide rails or tracks 32, the ends of which are curved downwardly. Upon entering the upper run of the chain the pivoted fingers are moved by the guide rail 32 to feeding position, and upon leaving the upper run at a point near the viner feed opening or throat, the fingers fall backwardly to a suspended position so as to release themselves from the vines without entangling the vines or dragging the vines through the deck slots.

In some instances, the feeding fingers may fail to swing to a freely suspended position on the lower run of the conveyer, because of a gummy mixture of dirt and vine juice on the pivotal connections. One possible abnormal position for a feeding finger is indicated at A in Fig. 1. If the finger is permitted to remain in such position with respect to the conveyer, the finger may fail to properly enter the upper run of the conveyer and thereby cause breakage or other damage.

In order to prevent such damage, means are provided for properly positioning the fingers before they reach the upper run of the conveyer. One suitable form of positioning means consists of an abutment member 33 placed in the path of each series of fingers, the member having a rounded nose 34 at its lower end to engage the fingers. By cam action, the fingers engaging the nose are turned downwardly on their pivots to the position in which they will smoothly enter the upper run of the conveyer. Each abutment member 33 is preferably in the form of a cast ribbed arm having a bore 35 through which the non-rotatable take-up shaft 20 extends, the arm being secured to the shaft by set-screws 36, Fig. 4, and being movable with the shaft when the latter is adjusted to take up conveyer slack. By this mounting the arm is properly positioned with respect to the chain and the fingers. The upper end of the arm 33 extends higher than the shaft 20 and has a flange 37 slidably engageable with the deck structure or other stationary parts of the conveyer trough or frame to angularly position the arm and to resist rotation of the arm on the shaft in any shifted position of the shaft. Each sprocket wheel 24 is confined against axial movement by the adjacent arm 33 at one side and by the adjacent shaft head 22 at the other side. The two abutment members 33 are similar but of opposite hand. If desired, the abutment members may be reversed on the shaft 20 to bring their rounded lower ends closer to the viner.

The upper conveyer shaft 19 is driven from the same source of power as the viner. One end of this shaft carries a gear 38 which meshes with a pinion 39 therebelow fast on a shaft 40 which is journalled in bearings 41 on the viner frame. A sprocket wheel 42 is loose on the shaft 40 and has end ratchet teeth 43 on its hub engageable with similar ratchet teeth 44 on a clutch sleeve 45 splined at 46 to the shaft 40 and urged toward the sprocket wheel by a coiled spring 47 surrounding the shaft and confined by a collar 48 on the shaft. The shaft is confined against axial movement by the pinion 39 and a collar 49 engaging opposite ends of one of the bearings 41. A chain 50 passes over the sprocket wheel 42 and extends upwardly to mesh with a sprocket wheel 51 on a shaft 52 journalled in bearing brackets 53 secured to the viner frame, the chain 50 also engaging an adjustably mounted idler roller 54. The shaft 52 carries a bevel gear 55 meshing with a bevel gear 56 on the outer end of the beater drum shaft 15.

By this connection the feeder conveyer is driven from the beater drum shaft at a suitable speed, the driving force being transmitted through the cooperating ratchet teeth on the sprocket wheel 42 and clutch sleeve 45. If the beater drum is driven in the reverse direction, either by accident or when cleaning or repairing the machine, the spring-pressed ratchet clutch sleeve 45 will yield and prevent movement of the feeder fingers 28 in the reverse direction, thereby avoiding damage to the feeder or to the driving connections.

While the invention is here shown to be embodied in a pea viner, it is also applicable to other machines where similar conditions are encountered.

What I claim as new and desire to secure by Letters Patent is:

1. In a feeder, the combination of an endless conveyer having feeding and return runs, a shaft for supporting one end of said conveyer, feeding fingers pivotally mounted on said conveyer and free to rotate thereon to any angular position, means for supporting said fingers in feeding position in the feeding run of said conveyer, said fingers each having a trailing weight arm and being swingable on the return run of said conveyer to various angular positions with respect to the conveyer, and an abutment arm supported by said shaft and having a portion projecting downwardly from said shaft and engageable with any of said fingers occupying any abnormal angular position with respect to the conveyer for rotatably displacing said fingers in advance of said feeding run to cause said fingers to enter said feeding run in proper position.

2. In a feeder, the combination of an endless conveyer having feeding and return runs, a shaft for supporting one end of said conveyer, feeding fingers pivotally mounted on said conveyer and free to rotate thereon to any angular position, means for supporting said fingers in feeding position in the feeding run of said conveyer, said fingers each having a trailing weight arm and being swingable on the return run of said conveyer to various angular positions with respect to the conveyer, and an abutment arm supported by said shaft and having a rounded nose at its lower end engageable with any of said fingers occupying any abnormal angular position with respect to said conveyer for rotatably displacing said fingers in advance of said feeding run to cause said fingers to enter said feeding run in proper position.

3. In a feeder, the combination of an endless conveyer having feeding and return runs, a shiftable take-up shaft for supporting the receiving end of said conveyer, a frame for said conveyer, feeding fingers pivotally mounted on said conveyer and free to rotate thereon to any angular position, means for supporting said fingers in feeding position in the feeding run of said conveyer, said fingers each having a trailing weight arm and being swingable on the return run of said conveyer to various angular positions with respect to said conveyer, and an abutment arm supported by said shaft and shiftable therewith and having a lower end portion engageable with any of said fingers occupying any abnormal angular position with respect to said conveyer for rotatably displacing said fingers in advance of said feeding run to cause said fingers to enter said feeding run in proper position, said shiftable abutment arm including an upwardly projecting portion having a slidable engagement with said frame to resist rotation of said member in shifted positions of said take-up shaft.

FRANK HAMACHEK, Jr.